United States Patent
Dong et al.

(10) Patent No.: US 7,443,062 B2
(45) Date of Patent: Oct. 28, 2008

(54) MOTOR ROTOR COOLING WITH ROTATION HEAT PIPES

(75) Inventors: Qimin J. Dong, Greer, SC (US); Chung-Lung Chen, Thousand Oaks, CA (US)

(73) Assignee: Reliance Electric Technologies LLC, Mayfield Heights, OH (US)

( * ) Notice: Subject to any disclaimer, the term of this patent is extended or adjusted under 35 U.S.C. 154(b) by 237 days.

(21) Appl. No.: 10/955,115

(22) Filed: Sep. 30, 2004

(65) Prior Publication Data

US 2006/0066156 A1   Mar. 30, 2006

(51) Int. Cl.
   *H02K 9/20* (2006.01)
(52) U.S. Cl. .......................... 310/54; 310/61; 310/60 A
(58) Field of Classification Search .................. 310/52, 310/54, 58, 59, 60 R, 61, 60 A
See application file for complete search history.

(56) References Cited

U.S. PATENT DOCUMENTS

| | | | |
|---|---|---|---|
| 3,488,532 A * | 1/1970 | Anderson et al. .............. 310/58 |
| 3,624,432 A * | 11/1971 | Merz ........................... 310/53 |
| 3,715,610 A * | 2/1973 | Brinkman ..................... 310/54 |
| 3,746,081 A * | 7/1973 | Corman et al. .............. 165/272 |
| 3,801,843 A * | 4/1974 | Corman et al. ................ 310/52 |
| 4,133,376 A | 1/1979 | Eilenberg et al. ............ 165/105 |
| 4,165,472 A | 8/1979 | Wittry .......................... 313/35 |
| 4,212,346 A | 7/1980 | Boyd .......................... 165/32 |
| 4,791,831 A | 12/1988 | Behnke et al. ............ 74/606 R |
| 4,830,092 A | 5/1989 | Lee ................................ 165/1 |
| 4,947,825 A | 8/1990 | Moriarty ..................... 126/439 |
| 5,018,571 A | 5/1991 | Holmberg, Jr. et al. ........ 165/41 |
| 5,056,213 A | 10/1991 | Behnke et al. ................ 29/596 |
| 5,077,103 A | 12/1991 | Wagner et al. ............. 428/34.1 |
| 5,101,888 A | 4/1992 | Sprouse et al. ......... 165/104.26 |
| 5,305,973 A | 4/1994 | Shortland et al. ....... 244/117 A |

(Continued)

FOREIGN PATENT DOCUMENTS

JP        54035307 A   *   3/1979

(Continued)

OTHER PUBLICATIONS

Alger, Philip L.; Induction Machines—Their Behavior and Uses; Second Edition, New Introduction by M. Harry Hesse; Copyright 1965, 1970 (third printing with additions 1995) by Gordon and Breach Science Publishers, Inc.

*Primary Examiner*—Tran Nguyen
(74) *Attorney, Agent, or Firm*—Thompson Coburn LLP

(57) ABSTRACT

A heat pipe is partially-filled with a liquid, such as water, and is used to transfer heat from a rotating element, such as a rotor, via phase change and internal recycle of the liquid. Several heat pipes may be disposed radially around the rotating axis of the rotating element. The heat pipes may have a curved inner surface with a curvature not corresponding to the central axis of the heat pipe and positioned opposite the rotating axis so to experience greater centrifugal forces, to advance formation of a liquid film to improve heat transfer. For a rotor, the heat pipes, though individually placed as revolving heat pipes, in total exhibit behavior that approximates the favorable heat-transfer behavior of a single larger rotating heat pipe, but with heat-transfer surface area dispersed throughout the rotor, and without compromising structural integrity of the rotor shaft.

19 Claims, 6 Drawing Sheets

U.S. PATENT DOCUMENTS

| | | | |
|---|---|---|---|
| 5,327,038 A | 7/1994 | Culp | 310/306 |
| 5,423,123 A | 6/1995 | McQuilkin et al. | 29/897.32 |
| 5,660,644 A | 8/1997 | Clemens | 136/245 |
| 5,990,595 A * | 11/1999 | Crowell | 310/261 |
| 6,088,906 A * | 7/2000 | Hsu et al. | 29/598 |
| 6,264,003 B1 | 7/2001 | Dong et al. | 184/104.1 |
| 6,380,655 B1 * | 4/2002 | Ide et al. | 310/211 |
| 6,422,754 B1 | 7/2002 | Dong et al. | 384/122 |
| 6,648,336 B1 | 11/2003 | Kostrzewsky et al. | 277/549 |
| 6,772,504 B2 * | 8/2004 | Weidman et al. | 29/598 |
| 6,879,069 B1 * | 4/2005 | Weidman et al. | 310/61 |

FOREIGN PATENT DOCUMENTS

| | | | |
|---|---|---|---|
| JP | 54136609 A | * | 10/1979 |
| JP | 54154014 A | * | 12/1979 |
| JP | 57062754 A | * | 4/1982 |
| JP | 57196849 A | * | 12/1982 |
| JP | 57196850 A | * | 12/1982 |
| JP | 62048241 A | * | 3/1987 |
| JP | 01129738 A | * | 5/1989 |

* cited by examiner

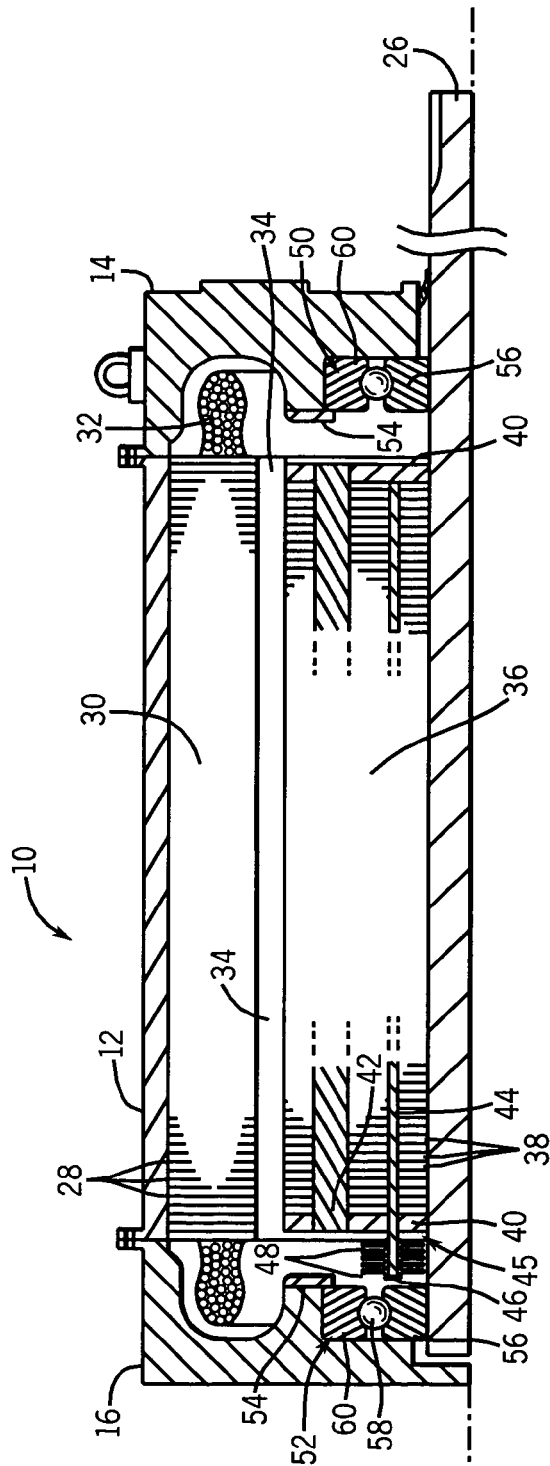
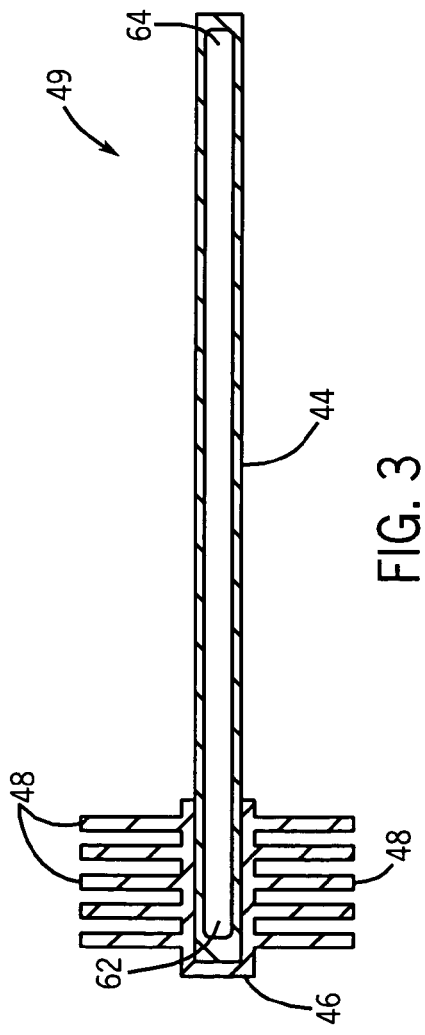
FIG. 2
FIG. 3

MOTOR ROTOR COOLING WITH ROTATION HEAT PIPES

BACKGROUND

The present invention relates to the use of heat pipes in the cooling of rotating elements such as rotors in electric motors. It should be emphasized that although the present discussion focuses on electric motors, the present technique affords benefits in heat removal in a number of systems employing rotating elements or components.

Electric motors of various types are commonly found in industrial, commercial and consumer settings. In industry, motors are employed to drive various kinds of machinery, such as pumps, conveyors, compressors, fans and so forth, to mention only a few. These motors generally include a stator having a multiplicity of coils surrounding a rotor. The rotor is typically supported by bearings for rotation in a motor frame. When power is applied to the motor, an electromagnetic relationship between the stator and the rotor causes the rotor to rotate. The speed of rotation of the rotor may be specified at predetermined speeds, for example, at 1200 revolutions per minute (rpm), 1800 rpm, 3600 rpm, and so on. On the other hand, the speed may be variable, such as where the motor is controlled via a variable frequency drive, for example. A rotor shaft extending through center of the rotor takes advantage of this produced rotation and translates the rotor's movement into a driving force for a given piece of machinery. That is, rotation of the rotor shaft drives the machine to which it is coupled.

During operation, conventional motors generate heat. By way of example, the physical interaction of the motor's various moving components produces heat by way of friction. Additionally, the electromagnetic relationships between the stator and the rotor produce currents that, in turn, generate heat due to resistive heating, for example. A particular source of resistive heating is the current flowing through the conductor bars disposed within the rotor. In general, excess heat left unabated may degrade the performance of the motor. Worse yet, excess heat may contribute to any number of malfunctions, which may lead to system downtime and require maintenance. Moreover, localized high operating temperatures (i.e., hotspots) sustained over time may lead to premature malfunction of the given location. Undeniably, reduced efficiency and malfunctions are undesirable events that may lead to increased costs.

To dissipate heat and to maintain the motor within acceptable operating temperatures, conventional motors route a coolant, such as forced air or liquid, through the stator and/or around the stator. Motor cooling designs have traditionally been directed toward the stator instead of the rotor because the stator is stationary and more accessible in operation, providing for relative ease in temperature monitoring and control. Moreover, motor applications have tended to be stator-limited with respect to operating temperature, and thus conventional approaches, such as shaft-mounted fan cooling, directed at the stator have generally been sufficient.

However, there are an increasing number of motor applications and designs where the rotor is prone to becoming excessively hot, and where cooling directed at the stator is not adequate in maintaining acceptable operating temperatures within the motor. Such rotor temperature-limited applications include, for example, high-power and/or high-density motors in the mining, heating, ventilating, and cooling industries. Other examples include hermetic motors and centrifuge motors. Hermetic motors are cooled by maintaining the motor submerged in a liquid or gas, and the inner part of the rotor (the part of the hermetically-sealed motor most removed from the refrigerant) tends to overheat. In the case of centrifuge motors, large starting times may result in undesirable temperature spikes within the rotor. Other motors that may experience high rotor temperatures include traction motors, Class I Division 2 motors having inverters, and so on. In general, motors in a variety of applications may experience excessive rotor temperatures and may benefit from direct cooling of the rotor. Placement of a heat pipe within the rotor to accomplish such direct cooling has generally been disregarded due to concerns about poor heat-pipe operation at the centrifugal forces associated with the relatively high rotating speeds of a rotor.

A heat pipe disposed in a rotating element may be classified as a rotating heat pipe or as a revolving heat pipe. A rotating heat pipe generally has the same center of rotation as the rotating element it is cooling. A revolving heat pipe generally does not. Operation of both types of heat pipes may be affected by centrifugal forces, especially at higher rotational speeds. The effects on heat-pipe operation, such as on the condensation, evaporation, and fluid flow of the internal liquid (e.g., water, ammonia, etc.), may be more pronounced with the revolving heat pipe because of its off-center radial position within the rotating element.

Some centrifugal force (e.g., less than one gravitational constant, g) may benefit operation of a revolving heat pipe. However, above 1 g, operation may become problematic. Thus, revolving heat pipes have generally not been employed to cool a rotor in an electric motor because, in part, a rotating rotor may generate centrifugal forces of up to 128 g and higher. In contrast, the rotating heat pipe, which would be typically positioned at the center of the rotor (e.g. in the rotor shaft), may exhibit more favorable heat transfer behavior at higher rotating speeds. However, a rotating heat pipe disposed at the center of the rotor would generally not provide adequate heat transfer area to sufficiently cool the rotor. Further, a rotating heat pipe disposed within the rotor shaft (e.g., a hollow rotor shaft configured as a rotating heat pipe) may compromise the structural integrity of the rotor shaft. In general, whether considering rotating or revolving heat pipes, heat pipe technologies have not made significant contribution to the thermal management of motors. Further, the thermal management of motors which are rotor-limited with regard to temperature remains unsatisfactory.

There is a need, therefore, for an improved technique for cooling an electric motor to accommodate excessive rotor temperatures. There is a need for direct cooling of the rotor within electric motors, such as through the use of heat pipes disposed in and/or around the rotor, providing for effective heat transfer at higher rotating speeds and greater centrifugal forces.

BRIEF DESCRIPTION

The present technique is designed to respond to such needs. A series of relatively small heat pipes are disposed in a rotor radially around the rotor center. For example, heat pipes may be positioned adjacent each aluminum conductor bar, a heat source within the rotor. The heat pipes, though individually placed as revolving heat pipes, exhibit behavior, in total, that approximates the favorable fluid-flow and heat-transfer behavior of a single larger rotating heat pipe. The advantageous behavior is due, in part, to a novel internal geometry of the heat pipes, which may include an arched inner surface which facilitates formation of a liquid film at higher rotating speeds. Further, unlike a rotating heat pipe, significant heat-transfer surface area is dispersed throughout the rotor. Also, the structural integrity of the rotor shaft is not compromised. Additionally, the heat pipes may be reduced in size to avoid adversely affecting the structural integrity of the rotor and rotor laminations, and to improve operation of the heat pipes. The technique provides for effective direct cooling of rotors and extends the service life of electric motors. It should be emphasized that although the discussion regarding the present technique focuses on electric motors, the technique affords benefits to a number of applications in which the cooling of a rotating element or device is a concern.

In one embodiment, a heat pipe includes a hollow member configured to receive a fluid and to transfer heat via phase change and internal recycle of the fluid. The hollow member includes a curved inner surface having an axis of curvature different than a central axis of the hollow member.

In another embodiment, a rotating element includes a body configured for rotation, and a plurality of heat pipes inserted into the body and extending outside the body. Each heat pipe comprises an inner volume partially-filled with a liquid and a central axis different than a rotating axis of the body, wherein the inner volume has a curved surface with a curvature axis different than the central axis.

In yet another embodiment, a rotor for an electric motor includes laminations substantially aligned and adjacency placed with respect to one another, and end rings which cooperate to secure the laminations with respect to one another to form the rotor. The rotor further includes conductor bars extending through the laminations and electrically coupled to one another via the end rings. Heat pipes extend through the laminations and each having a central axis that differs from a rotational axis of the rotor. At least one of the heat pipes has an inner volume partially-filled with a liquid and having an arched surface.

In another example, a rotor for an electric motor includes a plurality of laminations having a substantially circular cross section, and substantially aligned and adjacency placed with respect to one another. The rotor may also include end members disposed at ends of the plurality of laminations and which cooperate to secure the plurality of laminations to form the rotor. The rotor may further include a plurality of electrically conductive members extending through the plurality of laminations, wherein the plurality of electrically conductive members and the end members cooperate to form at least one closed electrical pathway. A plurality of heat-removing members extend through the laminations, each heat-removing member having a central axis offset from the rotor central axis.

In some examples, an electric motor may include an enclosure having first and second end portions and a frame disposed between the end portions, a stator having a plurality of stator laminations that form a rotor passageway, and a rotor having a plurality of rotor laminations disposed within the rotor passageway. A plurality of heat pipes partially-filled with a liquid may be disposed in the rotor radially around a rotational axis of the rotor, wherein at least one heat pipe has a curved interior surface, the curved interior surface having a different center of curvature than the center of the at least one heat pipe.

In certain embodiments, a method of cooling a rotating element includes embedding a plurality of heat pipes partially in the rotating element radially around a rotating axis of the rotating element. The method further includes vaporizing and condensing a liquid inside the plurality of heat pipes, wherein at least one of the plurality of heat pipes comprises a curved inner surface having a center of curvature different than a center of the at least one heat pipe.

In some embodiments, a method of manufacturing a heat pipe includes forming a hollow member having an arched interior surface and a plurality of substantially straight interior sides. The axis of curvature of the arched inner surface is different than a central axis of the hollow member.

In yet other embodiments, a method of manufacturing a rotor includes aligning rotor laminations having a generally circular lamination cross-section with respect to one another, and securing the rotor laminations with end members disposed at ends of the plurality of rotor laminations. The method further includes inserting electrically conductive members through the rotor laminations and coupling them to the end members. Heat-removing members are positioned in the rotor laminations so that a central axis of each heat-removing member is different than the central rotating axis of the rotor. At least one heat-removing member has an interior volume having a curved surface with an axis of curvature different than the central axis.

DRAWINGS

These and other features, aspects, and advantages of the present invention will become better understood when the following detailed description is read with reference to the accompanying drawings in which like characters represent like parts throughout the drawings, wherein:

FIG. 2 is a partial cross-section view of the motor of FIG. 1 along line 2-2 and having a cooling assembly in accordance with an embodiment of the present technique;

FIG. 3 is a diagrammatical representation of the cooling assembly of FIG. 1 and having a heat pipe and heat sink in accordance with an embodiment of the present technique;

DETAILED DESCRIPTION

As discussed in detail below, embodiments of the present technique provide for cooling of electric motors. Although the discussion regarding the present technique focuses on electric motors, it also affords benefits to a number of applications in which the cooling of a rotating element is a concern. Accordingly, the following discussion relates to exemplary embodiments of the present invention and, as such, should not be viewed as limiting the appended claims to the embodiments described.

Figure 1:
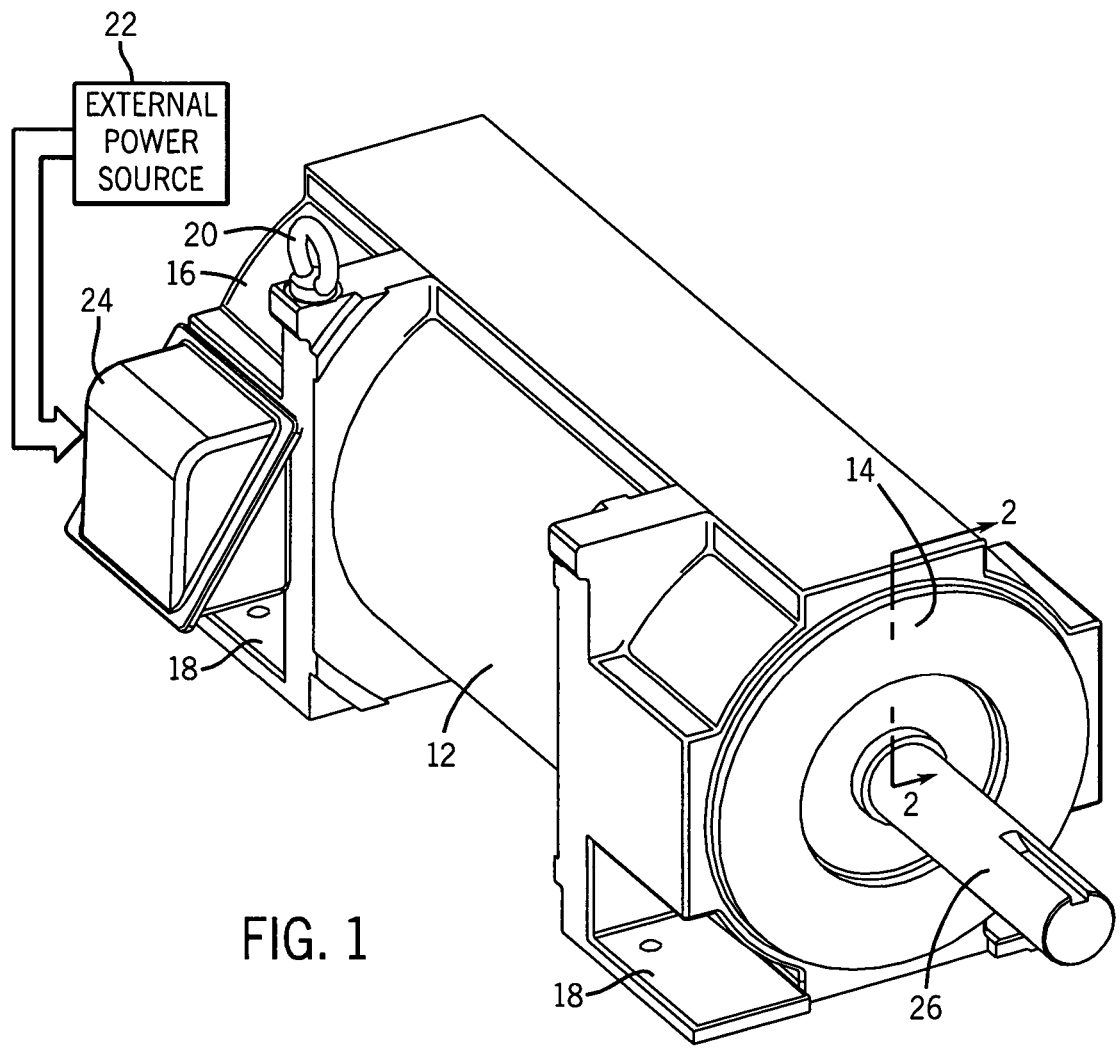
FIG. 1 is a perspective view of an electric motor having features in accordance with an embodiment of the present technique.

Turning to the drawings, FIG. 1 illustrates an exemplary electric motor 10. In the embodiment illustrated, the motor 10 comprises an induction motor housed in a National Electrical Manufacturers' Association (NEMA) motor housing. Industry associations, such as NEMA, develop particular standards and parameters for the construction of motor housings or enclosures. Of course, the present technique is applicable to a variety of motor housing constructions and is not limited to NEMA housings or NEMA frames.

The exemplary motor 10 comprises a frame 12 capped at each end by front and rear end caps 14 and 16, respectively. The frame 12 and the front (opposite drive end) and rear (drive end) end caps 14 and 16 cooperate to form the enclosure or motor housing for the motor 10. The frame 12 and the front and rear end caps 14 and 16 may be formed of any number of materials, such as cast iron, steel, aluminum, E-steel laminations, or any other suitable structural material. The end caps 14 and 16 may include mounting and transportation features, such as the illustrated mounting flanges (feet) 18 and eyehooks 20. Those skilled in the art will appreciate in light of the following description that a wide variety of motor configurations and devices may employ the rotor cooling techniques outlined below. Again, the cooling techniques described herein may apply to rotating elements that generate or absorb heat, whether or not the rotating element is disposed within a motor.

To induce rotation of the exemplary rotor, current is routed through stator windings disposed in the stator. (See FIG. 2.) Stator windings are electrically interconnected to form groups, which are, in turn, interconnected in a manner generally known in the pertinent art. The stator windings are further coupled to terminal leads (not shown), which electrically connect the stator windings to an external power source 22. As an example, the external power source 22 may comprise an ac pulse width modulated (PWM) inverter. As yet another example, the power source 22 may comprise a dc power source or a three-phase ac power source. In any event, a conduit box 24 houses the electrical connection between the terminal leads and the external power source 22 for the exemplary motor 10. The conduit box 24 may be formed of a metal or plastic material and, advantageously, provides access to certain electrical components of the motor 10. Moreover, the conduit box 24 may be designed and constructed to satisfy the electrical classification rating of the motor. Such classifications include, for example, explosion-proof, Class I Division 1, Class I Division 2, and so forth.

Routing electrical current from the external power source 22 through the stator windings produces a magnetic field that induces rotation of the rotor. A rotor shaft 26 coupled to the rotor rotates in conjunction with the rotor. That is, rotation of the rotor translates into a corresponding rotation of the rotor shaft 26. To support and facilitate rotation of the rotor and the rotor shaft 26, the exemplary motor 10 includes opposite drive end and drive end bearing sets carried within the opposite drive end and drive end caps 14 and 16, respectively. (See FIG. 2.) As appreciated by those of ordinary skill in the art, the rotor shaft 26 may couple to any number of drive machine elements, thereby transmitting torque to the given drive machine element. By way of example, machines such as pumps, compressors, fans, conveyors, and so forth, may harness the rotational motion of the rotor shaft 26 for operation.

During operation, the motor 10 generates heats. For example, the physical interaction between various components of the motor 10 generates heat via friction. Additionally, current in the stator windings as well as in the rotor conductor bars generates heat via resistive heating. Moreover, in the case of ac motors, eddy currents developed in the stator laminations may also produce heat. If left unabated, excess heat leads to a degradation of performance of the motor 10 and, in certain instances, may lead to malfunction of the motor. Accordingly, the exemplary motor 10 includes a cooling assembly inside the motor housing that cools the rotor and motor 10. The cooling assembly includes heat pipes disposed in the rotor to dissipate heat from the rotor interior (core), and may benefit motor applications where the rotor becomes excessively hot, such as in high-power and/or high-density motors, hermetic motors, mining motors, traction motors, centrifuge motors, and so forth.

FIG. 2 provides a partial cross-sectional view of the motor 10 of FIG. 1 along line 2-2. To simplify the discussion, only the top portion of the motor 10 is shown, as the structure of the motor 10 is essentially mirrored along its centerline. As discussed above, the frame 12 and the front and rear end caps 14 and 16 cooperate to form an enclosure or motor housing for the motor 10. Within the enclosure or motor housing resides a plurality of stator laminations 28 juxtaposed and aligned with respect to one another to form a stator core 30. The stator laminations 28 each include features that cooperate with one another to form slots that extend the length of the stator core 30 and that are configured to receive one or more turns of a coil winding 32, illustrated as coil ends in FIG. 2. Each stator lamination 28 also has a central aperture. When aligned with respect to one another, the central apertures of the stator laminations 28 may cooperate to form a contiguous rotor passageway 34 that extends through the stator core 30.

In the exemplary motor 10, a rotor 36 resides within this rotor passageway 34. Similar to the stator core 30, the rotor 36 has a plurality of rotor laminations 38 (e.g., steel) aligned and adjacently placed with respect to one another. Thus, the rotor laminations 38 cooperate to form a contiguous rotor 36. The exemplary rotor 36 also includes rotor end rings 40, disposed on each end of the rotor 36, that cooperate to secure the rotor laminations 38 with respect to one another. The exemplary rotor 36 also includes rotor conductor bars 42 that extend the length of the rotor 36. In the exemplary motor 10, the end rings 40 electrically couple the conductor bars 42 to one another. Accordingly, the conductor bars 42 and the end rings 40 comprise substantially nonmagnetic, yet electrically conductive materials (e.g., aluminum). As discussed below, inducing current in the rotor 36, specifically in the conductor bars 42, causes the rotor 36 to rotate. By harnessing the rotation of the rotor 36 via the rotor shaft 26, a machine coupled to the rotor shaft 26, such as a pump or conveyor, may operate.

To support the rotor 36, the motor 10 includes front and rear end bearing sets 50 and 52 that are secured to the rotor shaft 26 and that facilitate rotation of the rotor shaft 26 and rotor 36 within the stator core 30. By way of example, the exemplary bearing sets present a ball bearing construction; however, the bearing sets may present a sleeve bearing construction, among other types of bearing constructions. Advantageously, the end caps 14 and 16 include features, such as the illustrated inner bearing caps 54, which secure the bearing sets 50 and 52 within their respective end caps 14 and 16.

In the exemplary motor 10, the inner bearing caps comprise assemblies that are releaseably secured to the end caps 14 and 16. The bearing sets 50 and 52 transfer the radial and thrust loads produced by the rotor shaft 26 and rotor 30 to the motor housing. Each bearing set 50 and 52 includes an inner race 56 disposed circumferentially about the rotor shaft 26. The fit between the inner races 56 and the rotor shaft 26 causes the inner races 56 to rotate in conjunction with the rotor shaft 26. Each bearing set 50 and 52 also includes rolling elements 58 and an outer race 60. The rolling elements 58 may be disposed between the inner race 56 and the outer race 60. The rolling elements 58 facilitate rotation of the inner races 56 while the outer races 60 remains stationarily mounted with respect to the end caps 14 and 16. Thus, the bearing sets 50 and 52 facilitate rotation of the rotor shaft 26 and the rotor 36 while providing a support structure for the rotor 36 within the motor housing, i.e., the frame 12 and the end caps 14 and 16. To improve the performance of the bearing sets 50 and 52, a lubricant coats the rolling elements 58 and races 56 and 60, providing a separating film between to bearing components, thereby mitigating the likelihood of seizing, galling, welding, excessive friction, and/or excessive wear, to name a few adverse effects.

The exemplary motor 10 includes a plurality of heat pipes 44 inserted into the rotor laminations 38 to dissipate heat from the rotor 36 during operation. The heat pipes 44 may be positioned, for example, adjacent to the conductor bars 42 (e.g., die-cast aluminum bars) or embedded within each conductor bar 42. Also, the conductor bars 42 themselves may be configured to conduct heat, as well as conduct electricity. To improve operation, the heat pipes 44 may be inclined at some angle (e.g., 0.1° to 30°) from the rotor 36 horizontal axis. In the illustrated embodiment, the heat pipes 44 extend outside the rotor 36 to move heat from the center of the rotor 36 toward the end caps 14 and 16 and end rings 40. To facilitate dissipation of the heat, a heat sink 46 having fins 48 attaches to ends of the heat pipes 44 extending outside the rotor 36, providing additional heat-transfer surface area. A shaft mounted fan and other types of air/coolant cooling may further facilitate removal of the heat from the rotor 36 and motor 10. For example, forced coolant flow directed across the fins 48 may advance the condenser operation of the heat sink 46 and heat pipe 44 to increase heat removal. In sum, the heat pipes 44 and heat sinks 46 may combine to form cooling assemblies 49, and may be employed in direct cooling of the rotor 36. Such direct cooling may benefit motor temperature control in applications where the rotor 36 overheats, such as in high-power and high-density motor applications, and in applications with high output torque.

The present technique combines characteristics of the rotating and revolving heat pipes. In effect, a single larger rotating heat pipe is divided into several smaller tubes. The heat pipes are positioned as revolving heat pipes individually. However, depending on operating factors such as the rotational speed, the heat pipes may operate, in total, as a single, larger rotating heat pipe. At lower rotational speeds, the heat pipes 44 may behave and perform as revolving heat pipes. On the other hand, at high rotational speeds, the configuration may perform as a rotating heat pipe. In the latter case, as discussed below, a thin film of the operating liquid may be generated on an internal arched surface within the heat pipes. The arched surface may be centralized by the motor axis so that the surface experiences greater centrifugal force to facilitate formation of the film.

FIG. 3 illustrates the cooling assembly 49 of FIG. 2. The heat pipe 44 generally has an inner volume partially-filled with a liquid, such as water. This inner volume may operate under a vacuum to lower the boiling point (and condensation point) of the liquid. At the cooler end or condenser end 62 of the heat pipe 44, condensation of the liquid to remove latent heat may occur. Further, as indicated, the heat pipe 44 may employ a heat sink 46 at the condenser end 62 to improve heat transfer and condensation by providing surface area. Fins 48 may provide additional surface area. It should be noted that an increase in the size and number of fins 48 may increase heat removal, but may cause vibration at higher rotational speeds due to weight imbalances and other reasons. Therefore, the specified size of the heat sink 46 and fins 48 may depend on cooling requirements, the rotational speeds, and other factors of the particular application.

In operation, water vapor within the heat pipe 44 is condensed at the condenser end 62 of the heat pipe 44, dissipating latent heat outward through the heat sink 46. The condensed liquid within the heat pipe 44 then flows (e.g., by capillary action) along an inner surface of the heat pipe 44 toward the opposite end, the evaporator end 64 of the heat pipe 44. A wick structure disposed along the inner surface may promote and advance the capillary action. For the special cases of rotating and revolving heat pipes, the liquid may flow by centrifugal forces, which may become the primary pumping mechanism over the capillary action witnessed in conventional heat pipes. As the liquid travels toward the evaporator end 64, whether by capillary or centrifugal forces, or both, the liquid may form a thin film along the internal surface of the heat pipe 44. As the heat pipe 44 absorbs heat from the element being cooled, this internal liquid film is vaporized, consuming the heat as latent heat. The vapor then returns to the condenser end 62, where the vapor is condensed to dissipate the heat, completing the internal cycle.

The heat pipes 44 may be configured with a variety of features. For example, for a rotational cooling assembly 49, the heat pipe 44 may be inclined at some angle from the horizontal axis to improve the operation of the heat pipe 44. Further, the internal cross-section of the heat pipes 44 may deviate from a circular shape of the typical cylindrical hollow tubes employed for conventional heat pipes. Moreover, heat pipes 44 may be replaced by solid rods, such as those constructed of copper or steel (or of any high conductivity metal), to conduct and remove heat from the rotor 36. Similarly, the conductor bars 42 (e.g., aluminum) disposed within the rotor 36 may be utilized as solid rods to conduct heat, and may attached to heat sinks 46.

Figure 4:
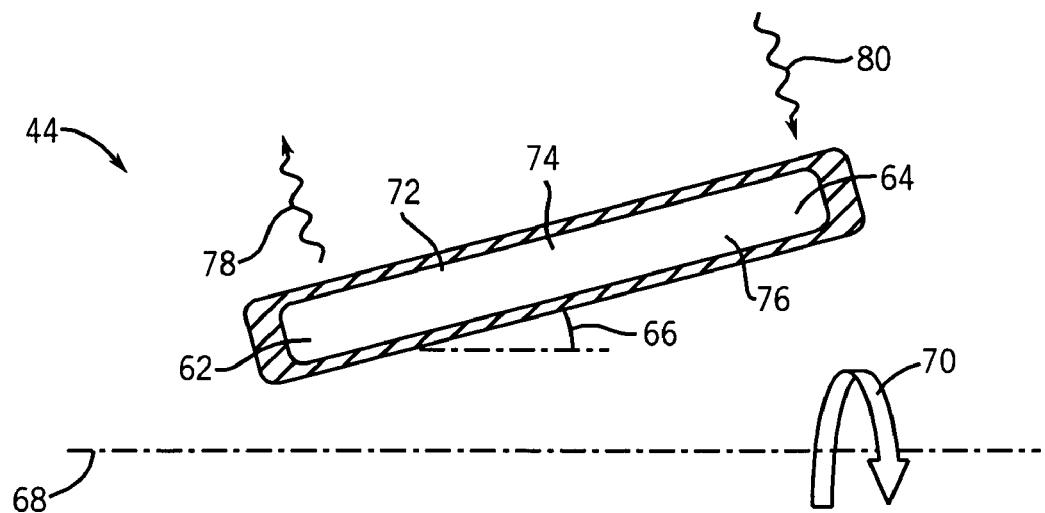
FIG. 4 is a diagrammatical representation of a heat pipe.

FIG. 4 illustrates principles of operation of conventional and rotating/revolving heat pipes, depicting an exemplary heat pipe 44 having the typical condenser and evaporator ends 62 and 64. Placement of heat pipes in rotation has been evaluated for over thirty years in the cooling of rotating or spinning hot objects. Again, however, large centrifugal acceleration has tended to render conventional heat pipe technologies invalid. Even so, heat pipes 44 in rotation share operating characteristics with conventional heat pipes, such as the capability to transport heat from an evaporator end 64 to a condenser end 62 based on liquid phase change. As with conventional heat pipes, the evaporation/boiling of liquid and condensation of vapor come into being via an internal recycle mechanism of the operating liquid in the heat pipe 44. With this recycle, a substantially continuous heat exchange is achieved. To facilitate operation and internal fluid flow, a heat pipe 44 in rotation may be set up at an inclined angle 66 relative to the rotational axis and/or machined with a tapered inner surface. However, both the inclined and tapered angles could be zero in some applications. In the illustrated embodiment, the exemplary heat pipe 44 has an inclined angle 66 as it rotates about the rotational axis 68 (e.g., rotor central axis), as indicated by arrow 70.

The heat pipe 44 has an inner volume containing a liquid, such as water, and is typically filled with the liquid at less than 50% by volume. As discussed, the condensed liquid at the condenser end 62 is pumped back to the evaporator end 64 by the centrifugal force of rotation and by the capillary force of a wick structure. Again, for conventional heat pipes, the capillary force of the wick structure may be the primary pumping mechanism. In contrast, as indicated for rotating/revolving heat pipes, the primary pumping force may be the centrifugal force. In operation, an internal liquid film 72 travels along the inner (upper) surface of the heat pipe 44, the surface optionally having a wick structure 74. Along the length of the heat pipe 44, heat is absorbed (i.e., from the rotor 36) as indicated by arrow 80, and the liquid film 72 is vaporized. At the evaporator end 64 of the heat pipe 44, the fluid within the heat pipe is primarily vapor 76. At the condenser end 62, heat is removed as indicated by arrow 78, and the vapor is condensed.

Figure 5:
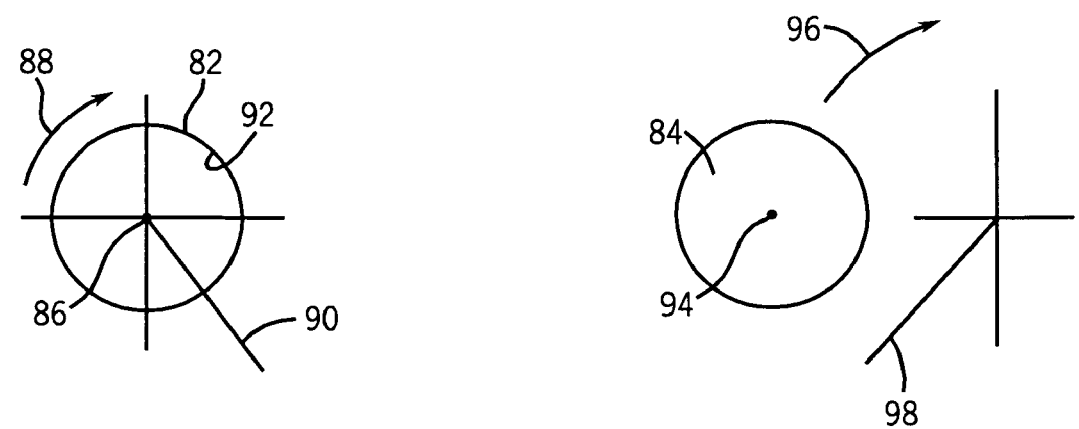
FIG. 5 is a diagrammatical representation of a rotating heat pipe and a revolving heat pipe.

As depicted in FIG. 5, heat pipes in rotation may be classified as a rotating heat pipe 82 or revolving heat pipe 84. A rotating heat pipe 82 may be defined as one that rotates longitudinally around its own central axis 86, as indicated by arrow 88. Thus, for a rotating heat pipe 82, the center of rotation 90 is the central axis 86 of the heat pipe 82. The internal cross-section of the rotating heat pipe 82 may be tapered (i.e., the inner surface 92 tapered) to enhance return of the operating liquid to the evaporator end 64. By comparison, a revolving heat pipe 84 is one that rotates around an axis different from its own central axis 94 and may be inclined (e.g., 0 to 90°) to facilitate return of the operating liquid to the evaporator end 64 and to improve other operating characteristics. For the revolving heat pipe 84, the rotation is indicated by arrow 96 with a center of rotation 98 different than the central axis 94. As discussed, the heat transfer performances of typical rotating and revolving heat pipes 82 and 84 may exhibit differences.

Figure 6:
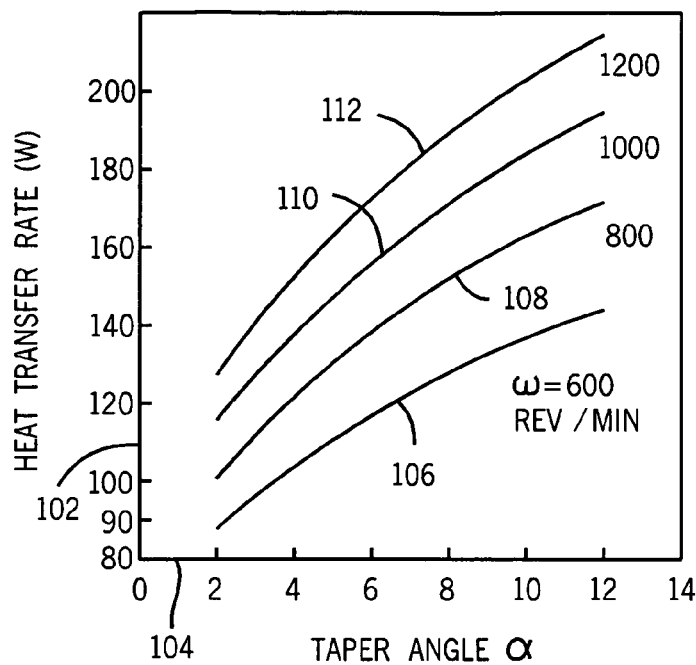
FIG. 6 is a plot of heat transfer rate versus taper angle at various rotation speeds.

For rotating heat pipes 82 with an internal taper, the heat transfer capability may be related to rotational speed and internal taper angle. A representation of this relationship is depicted in FIG. 6, which plots heat transfer rate 102 in Watts versus taper angle 104 in degrees at various rotational speeds in revolutions per minute (rpm). Curves 106, 108, 110, and 112 are given at rotational speeds of 600 rpm, 800 rpm, 1000 rpm, and 1,200 rpm, respectively. For rotating heat pipes 82 in this application, the heat transfer rate 102 improves with increasing rotational speeds and with increasing taper angle 104. Increases in taper angle 104 can enhance pumping forces and reduce film thickness of the operating liquid. Similarly, it is theorized that higher rotational speeds form a thinner liquid film along the inner surface and thus make for better performances of the evaporation and condensation processes. In this example, the heat transfer coefficient is proportional to the square root of the rotational speed. However, the heat transfer coefficient may degrade and perform poorly at very high rotational speeds (not illustrated), such as those giving above 20 times the gravitational constant, especially for rotating heat pipes configured without an internal taper. Above this level, it is theorized that the heat pipe, in certain applications, performs poorly due to an annular flow pattern that arises within the heat pipe 82. Moreover, other factors, such as the liquid fill volume ratio may impact the fluid regime and heat transfer.

Figure 7:
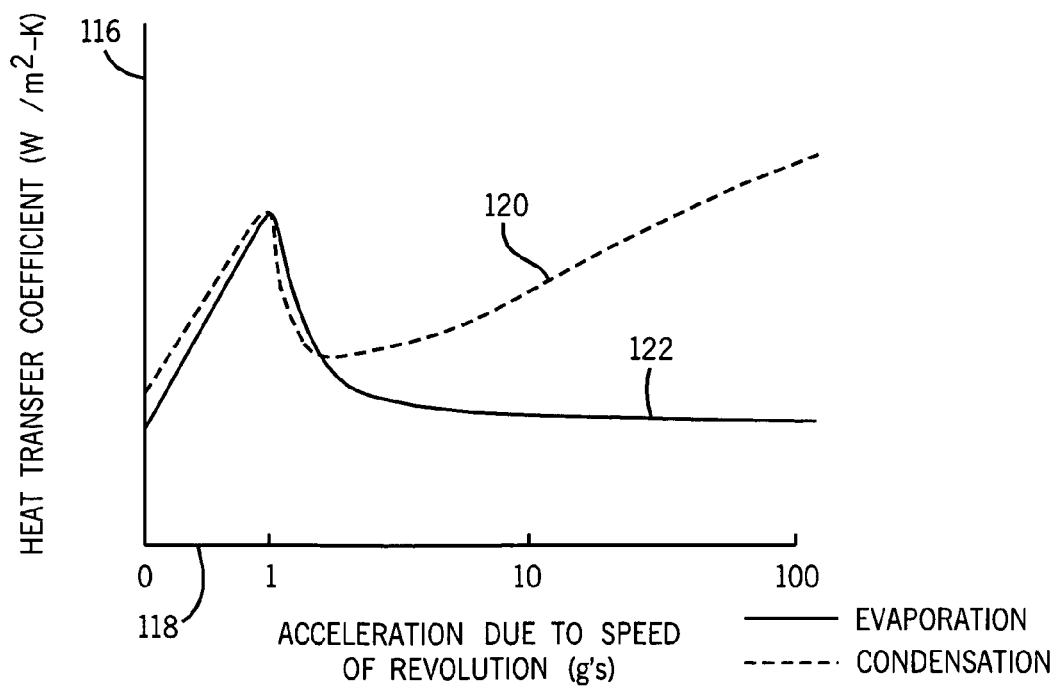
FIG. 7 is a plot of heat transfer coefficients versus the acceleration due to speed of revolution for both evaporation and condensation.

The performance of revolving heat pipes 84 is also related to rotational speeds (and centrifugal forces), as depicted in FIG. 7, which is a plot of the heat transfer coefficient 116 (in Watts per square meter-degrees Kelvin) versus acceleration 118 (in g's) due to speed of revolution. The data represented in FIG. 7 is for a revolving heat pipe 84 configured in a horizontal position and having heat-transfer coefficient curves 120 and 122 for evaporation and condensation, respectively. The heat transfer coefficients 116 for both evaporation and condensation increase with rotational speeds until the centrifugal force reaches about 1 g. Up to this point, it is theorized that the heat transfer coefficients 116 are enhanced by the operating liquid splash. With further increases of rotational speed and centrifugal force, however, the heat transfer coefficients 116 may degrade. For condensation, the performance may recover. However, for evaporation, the performance may at most stabilize at a lower level of heat transfer. It is theorized that such reduction in performance of the evaporation is due to the pool surface at the evaporator. This reduction in evaporative cooling at higher speeds may be even more problematic because heat loads tend to increase at higher rotational speeds.

For most rotational cooling applications, heat transfer with heat pipes may vary widely at various rotational speeds and heat loads. It has been thought that the revolving heat pipe 84 generally cannot provide good heat transfer performance at higher rotational speeds. This may be even more problematic when considering that as the performance of the revolving heat pipe 84 may degrade at higher operating speeds, the heat load typically increases at higher operating speeds. Thus, in the alternative, the rotating heat pipe 82 has been the focus in responding to cooling performance demands at higher rotational speeds, such as in driller motor shafts. However, for rotor cooling in high power density motors and other rotor temperature-limited motors, the rotor-shaft requirements of structure strength and sheer stress limit rotating heat pipe 82 applications. To overcome these problems, the present technique provides for new designs of heat pipes in motor rotor cooling that combine the advantages of rotating and revolving heat pipes 82 and 84. In general, the technique advances heat pipe technology with regard to cooling rotating components or devices.

Figure 8:
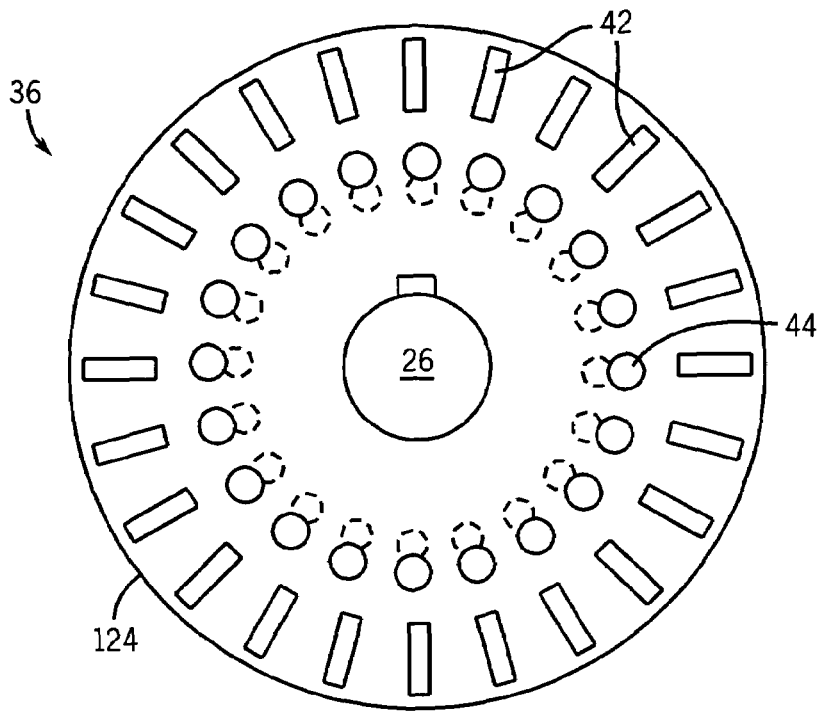
FIG. 8 is a diagrammatical representation of an end view of a rotor having aluminum conductor bars and heat pipes in accordance with an embodiment of the present technique.
Figure 9:
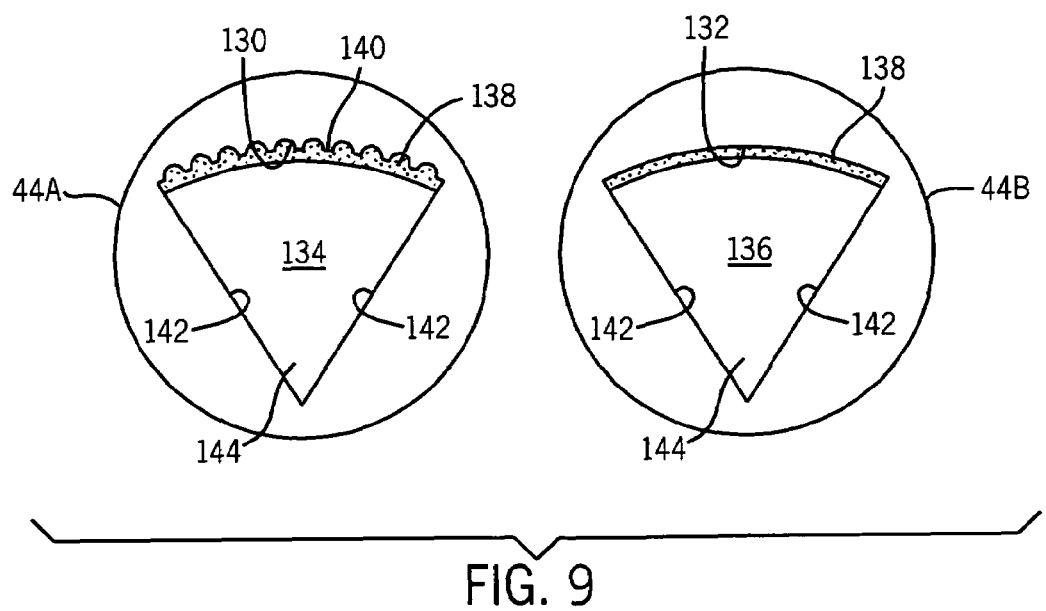
FIG. 9 is a diagrammatical representation of heat pipes having an arched inner surface and a substantially triangular cross section in accordance with an embodiment of the present technique.

FIGS. 8 and 9 illustrate heat pipe designs that combine characteristics of the rotating and revolving heat pipes. In these designs, a large rotating heat pipe is approximated by several small tubes which act as revolving heat pipes individually but perform as a rotating heat pipe in total. At lower rotational speeds, such as those giving centrifugal forces less than 1 one gravitational constant (g), the configuration may work as revolving heat pipes. During higher rotational speeds, the performance may simulate a rotating heat pipe, in which the operating liquid generates a thin liquid film on arched surfaces centralized by the motor axis. These arched or arcuate surfaces may have an axis of curvature different than the central axis of the heat pipe. Furthermore, the heat pipes may include more than one arcuate surface. Additionally, the cross-sections of the heat pipes may include a single hollow portion or a plurality of segregated hollow portions, and so on.

FIG. 8 is an end view of the rotor 36 of FIG. 2 having heat pipes 44 located close to the aluminum bars 42. The outer surface of the rotor 36 is denoted by the reference numeral 124. The heat pipes are inclined and thus the ends of each heat pipe 44 are depicted offset, with one end shown dashed. The number of heat pipes 44 may depend on the heat load, rotor shear strength requirements, and so forth. In operation, through phase change of the operating liquid (e.g., water), the heat pipes 44 move heat from the center of the rotor 36 to the end rings or end caps 14 and 16 and dissipate heat with the aid of shaft-mounted fan air cooling, for example. Further, an external heat sink 46 (not illustrated) may be attached to the heat pipes 44 to provide an extended surface for final heat dissipation. Moreover, the relative rotation of movements between the stator and the rotor may enhance the heat dissipation by the force convection of air. Finally, the heat pipes 44 are positioned as revolving heat pipes, but due to the relatively small size, the arched surface, and other features, the technique overcomes the typical questionable performance of revolving heat pipes above 1 g.

FIG. 9 depicts two heat pipes 44A and 44B having inner arched surfaces 130 and 132, which may have a center of curvature different than the centers of the heat pipes 44A and 44B, respectively. The exemplary cross sections 134 and 136 of the heat pipes are substantially triangular. However, these cross sections 134 and 136 may instead be substantially square, rectangular, oval, irregular, and so on. In operation, at high rotation speeds (e.g., >250 rpm), a thin liquid film 138 may be formed on the arched surfaces 130 and 132. In the first heat pipe 44A, the upper arched surface 130 has a wick structure 140. In contrast, the upper arched surface 132 of the second heat pipe 44B has a substantially smooth topography. The exemplary wick structure 140 has 200 micron or micrometer (μm) grooves and is introduced to improve the liquid pumping pressure at medium rotational speeds, for example. Such medium rotational speeds may be in the range of about 1 g to 10 g. Operationally, the wick structure 140 combines with the centrifugal force to supply (pump) adequate operating liquid to the evaporator end 64 for evaporative cooling at higher heat loads. In this embodiment, surfaces 142 are substantially straight and may provide for liquid flow to the arched surfaces 130 and 132, where the liquid film 138 is formed. Finally, as the film 138 travels toward the evaporator end 64 and the heat pipe 44A and 44B absorbs heat, the film 138 is vaporized to give vapor 144.

Consideration may be given to how much operating liquid which should be injected into the heat pipe. If a heat pipe operates at high rotational speeds, the thinner the liquid film is (i.e., less liquid), the better typically is the performance. For example, an approximate 10% fill ratio by volume may provide adequate performance. However, very low liquid fill ratios (<5%) may adversely affect the heat-pipe performance at low rotational speeds and higher heat loads (flux) due to less pumping pressure and/or operating liquid supply. In considering a variety of operating speeds and heat loads, typical fill ratios are in the range of 5-40%, and may depend on several design factors.

Moreover, the desired position and inclined angle 66 of the heat pipes 44 embedded in the rotor or other rotating element may depend on expected centrifugal forces and pumping pressure of the operating liquid. In certain design approaches of heat pipes 44 configured for smaller inclined angles 66, the operative centrifugal force along the heat pipe (e.g., along the middle of the heat pipe 44, and at the evaporator and condenser ends 62 and 64) may be assumed substantially constant to facilitate design calculations, for example. During operation, the powerful centrifugal force may drag the operating liquid to form a thin liquid film on the upper surface from the condenser to the evaporator. The liquid pumping pressure generated by the centrifugal force may be estimated according to the inclined angle 66, rotational speeds, and known correlations in the art. Below, Table 1 gives an exemplary relationship of speed and acceleration. Table 2 gives an exemplary relationship of the pumping pressures and inclined angles 66.

TABLE 1

| Acceleration as a Function of Rotational | | | |
|---|---|---|---|
| RPM | 250 | 750 | 1250 |
| Acceleration (meter/second$^2$) | 26.1 | 234 | 651 |
| Acceleration, g | 2.66 | 23.9 | 66.4 |

TABLE 2

| Pumping Pressures as a Function of Inclined Angles | |
|---|---|
| Inclined Angle (degrees) | Pressure × 10$^3$ (Pascal) |
| 4.0 | 7.72 |
| 3.0 | 5.79 |
| 2.0 | 3.86 |
| 1.0 | 1.93 |

For the four degree inclined angle in this application, the pressure is 7,720 Pascal and the liquid pumping capability approximates that of a 15-micron wick structure in a conventional heat pipe. In rotating heat pipe applications, a higher pumping pressure may desirable to provide an adequate amount of operating liquid to the evaporator during high heat load. However, this expectation may be limited by factors, such as rotor size.

Figure 10:
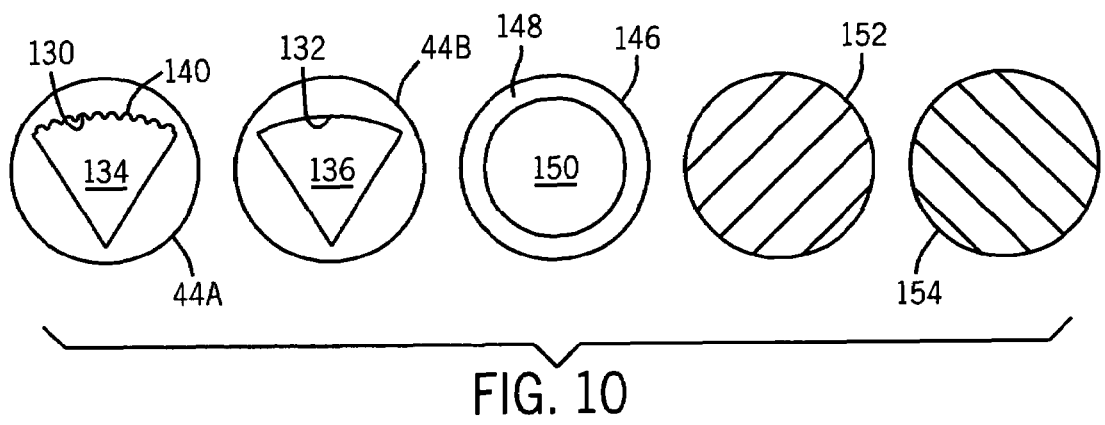
FIG. 10 is a diagrammatical representation of end views of various heat pipes in accordance with an embodiment of the present technique.

FIG. 10 depicts heat pipes and solid rods that may be employed to cool a rotor 36. The heat pipes 44A and 44B (of FIG. 9) having a substantially triangular cross section 134 and 136 and an internal upper arch surface 130 and 132 are again depicted. The upper arch surface 130 of heat pipe 44A has a wick structure 140 that may vary in size, for example, from 20 μm to 400 μm. The remaining heat pipe is a typical heat pipe 146 configured as an annulus 140 having an internal circular cross section 150. Finally, solid rods 152 and 154 are constructed of copper and steel, respectively, and may conduct heat without the internal recycle mechanism of evaporation/condensation in a heat pipe.

It should be noted that in general, prior to start up, heat pipes typically undergo a process of clean, vacuuming, liquid degassing, and injection. To compare performance of the three heat pipes 44A, 44B, and 146 shown in FIG. 10, the same amount of liquid mass may be injected into these three pipes. The same mass amount, however, may give differing fill ratios because the inner volumes may be of different size. For example, with the illustrated exemplary heat pipes having the same liquid mass, gives fill ratios of 20%, 18%, and 10%, by volume, for heat pipes 44A, 44B, and 146, respectively. Fabrication of the wick structure, in this example, increases the inner volume of the heat pipe 44A.

Comparison of the heat-transfer performance of the heat pipes and solid rods may include evaluation of the temperature difference from the hot end of the heat pipe or solid rod and the cool end of the heat pipe or solid rod. In heat pipes, this temperature difference may be the difference between the temperature at the evaporator end 64 minus the temperature at the condenser end 62 (see FIG. 2). Based on a temperature-difference evaluation of the heat pipes in a revolving heat pipe configuration and having the above listed fill ratios, the new heat pipes 44A and 44B, having the arched inner surfaces and the substantially triangular cross-sections, give an approximate 500% improvement in heat transfer over the steel rod 154, and an approximate 30% improvement in heat transfer over the heat pipe 146 having the typical circular cross-section. In Table 3 below, temperature difference data in the representative application is given for the three heat pipes 44A, 44B, and 146, and two solid rods 152 and 154, all having an identically configured heat sink. In general, a lower temperature difference means less resistance and better performance.

TABLE 3

Comparison of Temperature Difference (° C.) from Hot End to Cool End

| RPM | H.P. 44A | H.P. 44B | H.P. 146 | Rod 152 | Rod 154 |
|---|---|---|---|---|---|
| 250 | 13 | 17 | 20 | 56 | 107 |
| 750 | 13 | 19 | 15 | 50 | 87 |
| 1250 | 11 | 9 | 16 | 48 | 73 |

The hollow tube heat pipe 146 has a cooling performance giving a significant improvement in heat transfer compared with the steel and copper rods 152 and 154. Temperature gradients across the hollow tube heat pipe 146 at all there rotational speeds are 20° C. or lower. Moreover, from 750 rpm to 1250 rpm, the hollow tube heat pipe 146 does not show a significant performance change. This result is consistent with the assumption that after pool phase change is formed at a certain rotational speed (greater than 1 g at 250 rpm, for example), the heat transfer coefficient does not change significantly with the increase of rotational speed. The two more advanced designs of heat pipes 44A and 44B having the triangular cross sections further increase heat transfer and reduce the temperature gradient. For the heat pipe 44B without the wick structure, the temperature difference is only 9° C. at 1250 rpm and is less than the temperature difference of the heat pipe 44A having the wick structure at the same rotational speed. This may be because the smooth upper surface is more beneficial for generating a thinner liquid film at high rotational speeds. On the other hand, due to the wick structure's improvement on fluid flow and heat transfer at lower rotational speed, the heat pipe 44A having the wick structure has a lower temperature difference, 13° C., at 250 rpm. Finally, a larger heat sink 46 with more fins 48 may further improve the cooling and the performance.

The present technique provides for heat pipes as appropriate technologies for cooling rotating elements at higher rotational speeds, such as with motor rotor cooling. The temperature gradient and therefore the rotor temperature may be significantly reduced. The present technique provides for designs of rotation heat pipes that combine advantages of rotating and revolving heat pipes and that exhibit an excellent cooling performance. Heat pipes having an arched inner surface and disposed within the rotor, including those heat pipes having an internal wick structure, enhance liquid pumping capability to the evaporator end 64, and improve heat transfer stability and performance over a wide range of rotational speeds.

Figure 11:
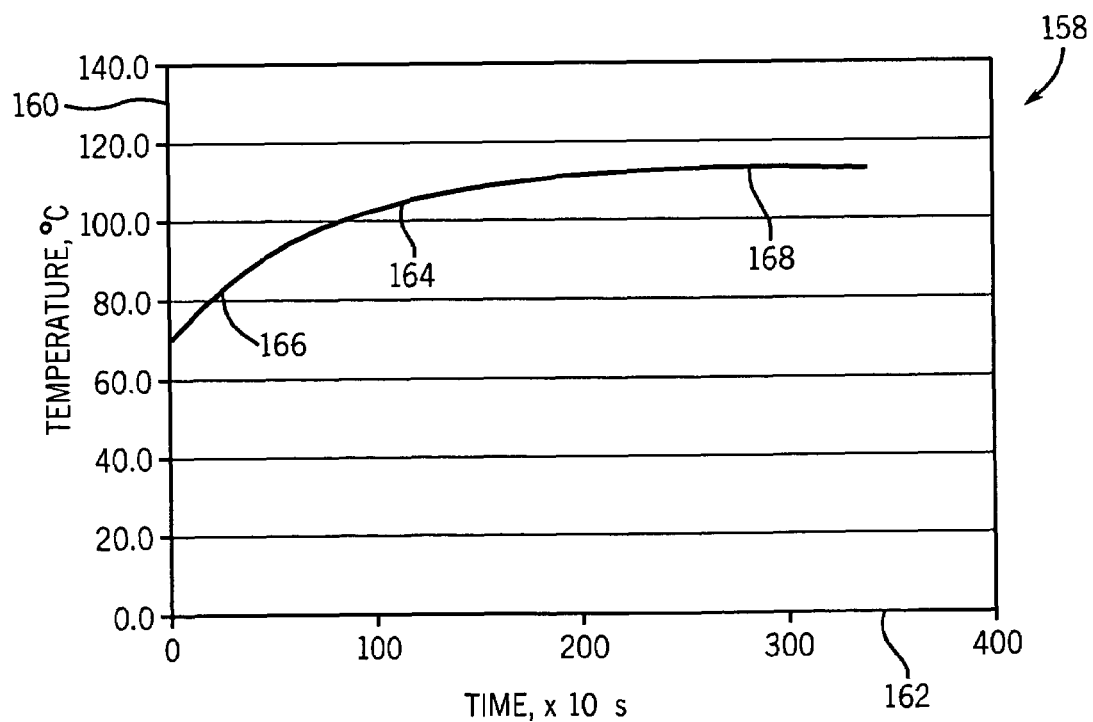
FIG. 11 is a plot of heat pipe evaporation temperature versus time.

Finally, it should be noted, as indicated in FIG. 11, that the evaporation temperature may only become stable after a certain period of time, due to the specific heat of the rotor mass, changes in internal pressure, and so forth. FIG. 11 is an exemplary plot 158 of evaporator temperature 160 over time 162. Initially, the evaporation temperature may be increasing (non-steady state condition), as depicted at point 166. Over time, the evaporation temperature reaches a steady state condition, as depicted at point 168. Data for comparison of the performance of different heat pipes may be more beneficial in the comparison if collected after the evaporative cooling reaches substantially steady state (e.g., point 168) with regard to evaporation temperature.

In summary, embodiments of the present technique provide for heat pipes that rotate and that combine characteristics of rotating and revolving heat pipes. For example, a large rotating heat pipe is effectively divided into many small tubes having an internal arched surface, and which may act as both a revolving heat pipe and a rotating heat pipe. At lower rotational speeds, the system may work as revolving heat pipes. At high rotational speeds, the system may emulate the advantageous heat-transfer performance of a rotating heat pipe. To accommodate heat removal from the motor, especially from the rotor 36 core, a cooling assembly 49 having a heat pipe 44 and heat sink 46 is provided. Several cooling assemblies 49 may be installed in a rotor 36 of an electric motor 10. For example, a cooling assembly 49 may be installed adjacent each aluminum conductor bar 42. In the alternative, the heat pipe 44 may be embedded in each conductor bar 42 (e.g., die-cast aluminum), or the bar 42 themselves may be fabricated as copper or aluminum bars and used as pseudo heat pipes. In certain embodiments, dissipation of the heat may be advanced by air-cooling by a shaft mounted fan or other types of air/refrigerant cooling, such as is employed in hermetic motors, and/or by attaching heat sinks 46 to the heat pipes. If heat sinks 46 are employed, they may have fins 48 which increase the available surface area for heat transfer, and thus may further advance dissipation of heat from the rotor 36 core.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A rotor for an electric motor, comprising:
   a plurality of laminations having a substantially circular cross section, wherein the plurality of laminations are substantially aligned and adjacently placed with respect to one another; end members disposed at ends of the plurality of laminations and which cooperate to secure the plurality of laminations to form the rotor;
   a plurality of electrically conductive members extending through the plurality of laminations, wherein the plurality of electrically conductive members and the end members cooperate to form at least one closed electrical pathway; and
   a plurality of heat-removing members extending through the plurality of laminations in a straight line from one end of the rotor to an opposite end of the rotor, each heat-removing member having a central axis offset from the rotor central axis in a manner such that the heat-removing members together describe a conical shape within the rotor laminations when rotating about the rotor central axis;
   wherein the plurality of heat-removing members comprise a plurality of heat pipes each having a sealed inner volume partially-filled with a liquid;
   wherein at least one heat pipe-interior volume has a substantially triangular cross-section;
   wherein the interior volume comprises an arcuate surface; and
   wherein the arcuate surface corresponds to a radius of rotation of the heat-removing member about the rotor central axis.

2. A rotor for an electric motor, comprising:
   laminations substantially aligned and adjacently placed with respect to one another;
   end rings which cooperate to secure the laminations with respect to one another to form the rotor;
   conductor bars extending through the laminations and electrically coupled to one another via the end rings; and
   heat pipes extending through the laminations from one end of the rotor to an opposite end of the rotor, each heat pipe having a central axis that differs radially relative to a rotational axis of the rotor from one end of the rotor to the opposite end of the rotor, the heat pipe central axis together with the rotor rotational axis defining a radial plane extending though the rotor, wherein at least one heat pipe has a sealed inner volume partially-filled with a liquid and having an arched surface;

wherein the arched surface of the heat pipe corresponds to a radius of rotation of the heat pipe about the rotor rotational axis.

3. A rotor for an electric motor, comprising:

laminations substantially aligned and adjacently placed with respect to one another;

end rings which cooperate to secure the laminations with respect to one another to form the rotor;

conductor bars extending through the laminations and electrically coupled to one another via the end rings; and heat pipes extending through the laminations from one end of the rotor to an opposite end of the rotor, each heat pipe having a central axis that differs radially relative to a rotational axis of the rotor from one end of the rotor to the opposite end of the rotor, the heat pipe central axis together with the rotor rotational axis defining a radial plane extending though the rotor, wherein at least one heat pipe has a sealed inner volume partially-filled with a liquid and having an arched surface.

4. The rotor as recited in claim 3, wherein a cross section of the inner volume is substantially triangular.

5. The rotor as recited in claim 3, wherein the inner volume comprises a plurality of segregated sections.

6. The rotor as recited in claim 3, wherein the heat pipes are disposed adjacent the conductor bars.

7. The rotor as recited in claim 3, further comprising heat sinks coupled to the ends of the heat pipes extending outside the laminations.

8. The rotor as recited in claim 3, wherein the laminations comprise steel.

9. The rotor as recited in claim 3, wherein at least one of the conductor bars and end rings comprise aluminum.

10. The rotor as recited in claim 3, wherein at least one of the heat pipes is adapted to rotate about its center axis as the rotor rotates about its rotational axis.

11. The rotor as recited in claim 10, wherein the at least one heat pipe rotates about its center axis after the rotor reaches a preselected rotational speed.

12. A rotor for an electric motor, comprising:

a plurality of laminations having a substantially circular cross section, wherein the plurality of laminations are substantially aligned and adjacently placed with respect to one another; end members disposed at ends of the plurality of laminations and which cooperate to secure the plurality of laminations to form the rotor;

a plurality of electrically conductive members extending through the plurality of laminations, wherein the plurality of electrically conductive members and the end members cooperate to form at least one closed electrical pathway; and a plurality of heat-removing members extending through the plurality of laminations in a straight line from one end of the rotor to an opposite end of the rotor, each heat-removing member having a central axis offset from the rotor central axis in a manner such that the heat-removing members together describe a conical shape within the rotor laminations when rotating about the rotor central axis;

wherein the plurality of heat-removing members comprise a plurality of heat pipes each having a sealed inner volume partially-filled with a liquid.

13. The rotor as recited in claim 12, wherein the plurality of heat-removing members are disposed adjacent the plurality of electrically conductive members.

14. The rotor as recited in claim 12, wherein at least one heat pipe interior volume has a substantially triangular cross-section.

15. The rotor as recited in claim 14, wherein the interior volume comprises an arcuate surface.

16. The rotor as recited in claim 15, wherein the interior volume comprises a plurality of arcuate surfaces.

17. The rotor as recited in claim 12, wherein at least one of the heat-removing members is adapted to rotate about its center axis as the rotor rotates about its rotational axis.

18. The rotor as recited in claim 17, wherein the at least one heat pipe rotates about its center axis after the rotor reaches a preselected rotational speed.

19. A system of manufacturing a rotor, comprising:

means for aligning a plurality of rotor laminations having a generally circular lamination cross-section with respect to one another;

means for securing the plurality of rotor laminations with end members disposed at ends of the plurality of rotor laminations;

means for inserting a plurality of electrically conductive members through the rotor laminations and coupling the electrically conductive members to the end members; and means for positioning a plurality heat-removing members in the rotor laminations extending from one end of the rotor to an opposite end of the rotor in a manner so that a central axis of each heat-removing member varies at constant rate radially relative to the central rotating axis of the rotor from one end of the rotor to the opposite end of the rotor, wherein at least one heat-removing member has a sealed interior volume partially filled with a liquid, the interior volume having a curved surface with an axis of curvature different than the central rotating axis of the rotor.

* * * * *